UNITED STATES PATENT OFFICE.

DAVID J. OGILVY, OF CINCINNATI, OHIO.

PAINT-DRIER.

SPECIFICATION forming part of Letters Patent No. 699,555, dated May 6, 1902.

Application filed July 24, 1899. Renewed October 3, 1900. Serial No. 31,878. (No specimens.)

*To all whom it may concern:*

Be it known that I, DAVID J. OGILVY, a citizen of the United States, residing in Cincinnati, county of Hamilton, and State of Ohio, have invented certain new and useful Improvements in Paint-Driers, of which the following is a full, clear, and exact description.

The object of this invention is to produce easily and quickly and at a low cost a strong and efficient siccative which may be used to advantage where higher-priced driers made from linseed-oil, resins, &c., are now used. I attain this object by employing rosin-oils produced by the destructive distillation of rosin, which I combine with manganese, lead, and calcium oxids, thereby producing a heavy liquid containing the aforementioned oxids in solution.

In my United States Patent No. 374,370, of December 6, 1887, I have disclosed a method of manufacturing siccatives from rosin-oils in combination with manganese oxid or an easily-decomposed salt thereof, the product from this operation being a heavy brown liquid which works satisfactorily; but it is frequently necessary to reduce this to a thinner condition with solvents, such as petroleum spirits or turpentine, so as to suit the season and requirements of the trade. I have found that when thus reduced and the lead oxid is used in connection with the manganese the solution is very apt to deteriorate with age, losing its drying properties and causing a waste of the material. From investigations which I have made I find that by employing an earthy oxid, such as calcium or magnesium oxid, along with the manganese dioxid and the lead oxid the result is in a condition by which it is improved by age in place of being deteriorated, besides being cheaper than driers previously produced.

In carrying out my invention the larger the quantity operated on the more satisfactory, as a rule, is the result.

The process is as follows: Introduce into a suitable vessel, which may be in the form of a still with condenser attached, say two thousand five hundred gallons of the crude rosin-oil. Then add, say, three hundred and eighty to four hundred pounds manganese dioxid, one hundred and seventy to one hundred and eighty of the lead monoxid, and about two hundred and twenty pounds calcium hydroxid, all in a state of fine division, which may be in either a hydrous or anhydrous condition. The mixture is then heated, with constant agitation, until the oxids have been dissolved. The result should then consist of a heavy transparent colored liquid.

The proportions given are subject to variation from such causes as the purity of the oxids or their equivalent salts and the character of the rosin-oil. The more resinous the rosin-oil is the greater the quantity of the oxids they will absorb. The resinous nature of the rosin-oil may be increased by the addition of rosins or by the removal of sufficient of the lighter constituents of the oil by heat. The ultimate use of the drier also influences the proportions of oxids necessary—as, for example, for light-colored and quick soft-skimming driers I increase the lead and calcium oxids, while for dark and hard-drying results I increase the manganese oxid and reduce the quantity of either the lead or calcium oxids. Of the earthy oxids calcium hydroxid gives the best results, while being more economical, and it may be introduced into the oil either in a state of powder or moist paste or in the condition of a lime soap.

The resulting oily solution of the oxids may be used in the above form as a drying agent or it may be reduced to a more fluid condition by means of a suitable solvent—such as petroleum oils or spirits, turpentine, &c.— an average proportion being equal parts, by bulk, of the oily solution of the oxids and petroleum spirit, or where turpentine is used one part turpentine to three parts oily solution of the oxids.

Having thus described my invention, what I claim, and desire to secure by Letters Patent, is—

1. A drier for paints, oils, and such like, resulting from the combination of manganese, lead, and calcium oxids, with rosin-oils, at an elevated temperature, substantially as specified.

2. A drier for paints, oils, and such like, resulting from the combination of manganese, lead, and calcium oxids with rosin-oil at an elevated temperature, and reduced to a proper consistency with a suitable solvent, substantially as specified.

DAVID J. OGILVY.

Witnesses:
    H. G. EDWARDS,
    ALFRED T. FULFORD.